(12) United States Patent
Ewald et al.

(10) Patent No.: US 11,305,487 B2
(45) Date of Patent: Apr. 19, 2022

(54) ADDITIVE MANUFACTURING ROLLER WITHIN RADIATIVE HEAT TRANSFER AREA

(71) Applicant: HEWLETT-PACKARD DEVELOPMENT COMPANY, L.P., Houston, TX (US)

(72) Inventors: Brent Ewald, Vancouver, WA (US); Eric Collins, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 8 days.

(21) Appl. No.: 16/075,644

(22) PCT Filed: Apr. 21, 2017

(86) PCT No.: PCT/US2017/028990
§ 371 (c)(1),
(2) Date: Aug. 4, 2018

(87) PCT Pub. No.: WO2018/194688
PCT Pub. Date: Oct. 25, 2018

(65) Prior Publication Data
US 2021/0197452 A1    Jul. 1, 2021

(51) Int. Cl.
*B29C 64/218* (2017.01)
*B29C 64/295* (2017.01)
(Continued)

(52) U.S. Cl.
CPC .......... *B29C 64/165* (2017.08); *B29C 64/194* (2017.08); *B29C 64/209* (2017.08);
(Continued)

(58) Field of Classification Search
CPC ... B29C 64/153; B29C 64/218; B29C 64/141; B29C 64/147; B29C 64/194; B29C 64/295
See application file for complete search history.

(56) References Cited

U.S. PATENT DOCUMENTS 4,752,352 A * 6/1988 Feygin .................. B29C 64/147
                                                 216/33
5,876,550 A * 3/1999 Feygin .................... B29C 41/36
                                                 156/264
(Continued)

FOREIGN PATENT DOCUMENTS

CN    106270877 A    1/2017
EP      3053730 A1   8/2016
(Continued)

OTHER PUBLICATIONS

King, W.E. et al., Laser powder bed fusion additive manufacturing of metals; physics, computational, and materials challenges, Applied Physics Reviews 2, 041304, 2015.
(Continued)

*Primary Examiner* — Atul P. Khare
(74) *Attorney, Agent, or Firm* — Dicke Billig & Czaja PLLC

(57) ABSTRACT

Some examples include a fusing system for an additive manufacturing machine including a carriage movable across a build zone along the x-axis, a thermic source mounted to the carriage, and a roller mounted to the carriage adjacent to the thermic source. A longitudinal section of an exterior surface of the roller is exposed to indirect heat from the thermic source. The roller is controlled to rotate during and outside of a spreading operation of the build material. The carriage is to maintain the roller within a radiative heat transfer area of the thermic source.

15 Claims, 8 Drawing Sheets

(51) Int. Cl.
*B29C 64/165* (2017.01)
*B29C 64/282* (2017.01)
*B29C 64/232* (2017.01)
*B29C 64/245* (2017.01)
*B29C 64/209* (2017.01)
*B29C 64/236* (2017.01)
*B29C 64/194* (2017.01)
*B33Y 10/00* (2015.01)
*B33Y 30/00* (2015.01)

(52) U.S. Cl.
CPC .......... *B29C 64/218* (2017.08); *B29C 64/232* (2017.08); *B29C 64/236* (2017.08); *B29C 64/245* (2017.08); *B29C 64/282* (2017.08); *B29C 64/295* (2017.08); *B33Y 10/00* (2014.12); *B33Y 30/00* (2014.12)

(56) References Cited

U.S. PATENT DOCUMENTS

| | | | | |
|---|---|---|---|---|
| 5,943,235 A * | 8/1999 | Earl | ............ | B29C 64/40 |
| | | | | 700/98 |
| 6,030,199 A * | 2/2000 | Tseng | ............ | C04B 35/14 |
| | | | | 425/132 |
| 6,169,605 B1 * | 1/2001 | Penn | ............ | H05K 3/125 |
| | | | | 358/1.1 |
| 6,357,855 B1 * | 3/2002 | Kerekes | ............ | B33Y 30/00 |
| | | | | 347/40 |
| 6,896,839 B2 * | 5/2005 | Kubo | ............ | B29C 64/165 |
| | | | | 264/460 |
| 7,008,209 B2 | 3/2006 | Iskra et al. | | |
| 7,073,442 B2 * | 7/2006 | Fedor | ............ | B33Y 10/00 |
| | | | | 101/480 |
| 8,636,494 B2 * | 1/2014 | Gothait | ............ | B33Y 30/00 |
| | | | | 425/143 |
| 8,646,877 B2 | 2/2014 | Thompson et al. | | |
| 9,492,956 B2 | 11/2016 | Horiuchi | | |
| 9,931,785 B2 * | 4/2018 | Cullen | ............ | B22F 10/20 |
| 10,300,548 B2 * | 5/2019 | Fisser | ............ | B23K 9/26 |
| 10,391,754 B2 * | 8/2019 | Hakkaku | ............ | B29C 64/112 |
| 10,639,853 B2 * | 5/2020 | Ohi | ............ | B29C 64/171 |
| 10,843,409 B2 * | 11/2020 | Kobayashi | ............ | B29C 64/227 |
| 10,981,331 B2 * | 4/2021 | Barnes | ............ | B29C 64/205 |
| 11,072,123 B2 * | 7/2021 | Hartman | ............ | B29C 64/393 |
| 2002/0104973 A1 * | 8/2002 | Kerekes | ............ | B33Y 40/00 |
| | | | | 250/559.2 |
| 2005/0104241 A1 * | 5/2005 | Kritchman | ............ | B29C 64/112 |
| | | | | 264/40.1 |
| 2005/0242473 A1 | 11/2005 | Newell et al. | | |
| 2014/0255666 A1 | 9/2014 | Stucker et al. | | |
| 2014/0265045 A1 * | 9/2014 | Cullen | ............ | B29C 64/357 |
| | | | | 264/497 |
| 2014/0314613 A1 | 10/2014 | Hopkinson et al. | | |
| 2015/0136318 A1 * | 5/2015 | Tiefel | ............ | B29C 64/147 |
| | | | | 156/272.8 |
| 2015/0165681 A1 | 6/2015 | Fish et al. | | |
| 2016/0039152 A1 * | 2/2016 | Hara | ............ | B33Y 10/00 |
| | | | | 264/308 |
| 2016/0059482 A1 * | 3/2016 | Hakkaku | ............ | B33Y 30/00 |
| | | | | 264/401 |
| 2016/0067929 A1 | 3/2016 | Park | | |
| 2016/0311164 A1 | 10/2016 | Miyano | | |
| 2017/0021419 A1 | 1/2017 | Ng et al. | | |
| 2017/0100896 A1 * | 4/2017 | Hakkaku | ............ | B33Y 30/00 |
| 2018/0194060 A1 * | 7/2018 | Hara | ............ | B29C 64/209 |
| 2018/0250871 A1 * | 9/2018 | Mugishima | ............ | B29C 64/295 |

FOREIGN PATENT DOCUMENTS

| | | | | |
|---|---|---|---|---|
| JP | 08137325 A | | 5/1996 | |
| WO | WO-2014144482 A1 | | 9/2014 | |
| WO | WO-2015056230 A1 * | | 4/2015 | ............ B33Y 10/00 |
| WO | WO-2016048348 A1 | | 3/2016 | |
| WO | WO-2016119898 A1 | | 8/2016 | |

OTHER PUBLICATIONS

Roy, N.K., µ-SLS of Metals: Design of the powder spreader, powder bed actuators and optics for the system, 2015 < https://sffsymposium.engr.utexas.edu/sites/default/files/2015/2015-11-Roy.pdf >.

Wimpenny, Selective Infrared Sintering of Polymeric Powders using Radiant IR Heating & Ink Jet Printing, DeMontfort University, Sep. 14, 2006, pp. 789-799.

* cited by examiner

ADDITIVE MANUFACTURING ROLLER WITHIN RADIATIVE HEAT TRANSFER AREA

BACKGROUND

Additive manufacturing machines produce 3D objects by building up layers of material. Some additive manufacturing machines are commonly referred to as "3D printers." 3D printers and other additive manufacturing machines make it possible to convert a CAD (computer aided design) model or other digital representation of an object into the physical object. The model data may be processed into slices each defining that part of a layer or layers of build material to be formed into the object.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

In some additive manufacturing processes, thermic energy is used to fuse together the particles in a powdered build material to form a solid object. Thermic energy to fuse the build material may be generated, for example, by applying a liquid fusing agent to a thin layer of powdered build material in a pattern based on the object slice and then exposing the patterned area to fusing energy. Fusing energy absorbing components in the fusing agent absorb fusing energy to help sinter, melt or otherwise fuse the build material. The process is repeated layer by layer and slice by slice to complete the object.

Figure 1:
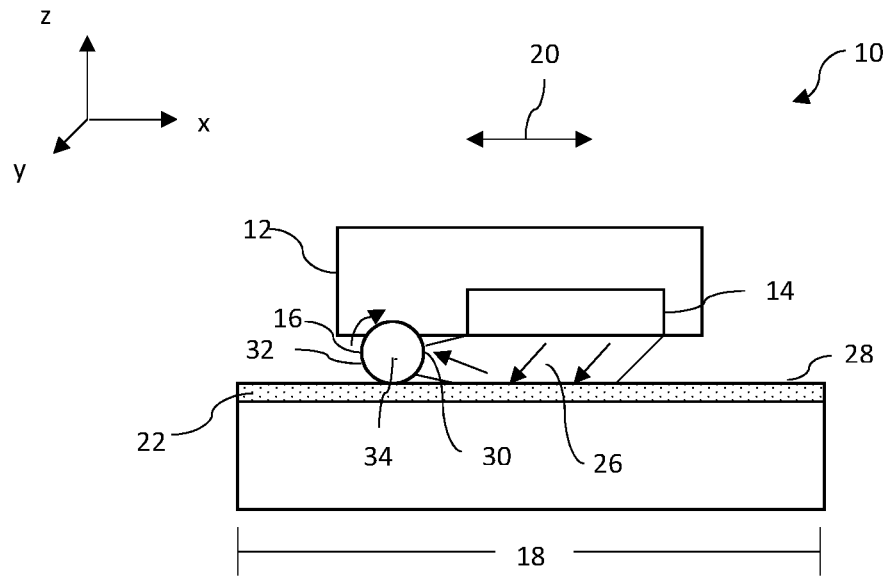
FIG. 1 is a schematic side view of a fusing system of an additive manufacturing machine in accordance with aspects of the present disclosure.

FIG. 1 is a schematic side view of a fusing system 10 of an additive manufacturing machine 100 in accordance with aspects of the present disclosure. Fusing system 10 includes a carriage 12, a thermic source 14, and a roller 16. Carriage 12 is movable across a build zone 18 in an x-axial direction and thermic source 14 and roller 16 are mounted to carriage 12 to be moved with carriage 12 across build zone 18 in the x-axial direction as indicated by arrow 20. As indicated by arrow 20, carriage 12, including thermic source 14 and roller 16, is movable bi-directionally along the x-axis. Thermic source 14 can heat a build material 22 and a fusing agent 24 (see, e.g., FIG. 2) contained within build zone to form a three dimensional object.

Roller 16 is mounted to carriage 12 and positioned within a radiative heat transfer area 26 generated by thermic source 14, as described further below. Radiative heat transfer area 26 has a view factor between thermic source 14 and roller 16. The view factor is a coefficient scaling radiation exchange between two heat sources determined by geometric factors. Heat flux provided by thermic source 14 and roller 16 can be determined by the view factor, emission spectra, temperature, and power between thermic source 14 and roller 16. Roller 16 within radiative heat transfer area 26 receives localized heat including reflective energy generated by thermic source 14. Radiative heat transfer area 26 includes direct and indirect thermic energy including reflective energy generated by thermic source 14 and reflected from a build surface 28 formed of build material 22 and fusing agent 24, for example, within build zone 18. Excess irradiant energy from thermic source 14 is absorbed by roller 16 along a longitudinal section 30 of an exterior surface 32 of roller 16 extending along a y-axis orthogonal to the x-axis.

Roller 16 is cylindrical and is rotatable around a central longitudinal axis 34 extending in the y-axial direction. Rotating roller 16 while exposing roller 16 to irradiant energy from thermic source 14 uniformly heats exterior surface 32 of roller 16. Roller 16 can be rotated within radiative heat transfer area 26 to provide uniform heating of exterior surface 32 around an entire outer circumference of roller 16. Uniform heating of roller 16 can assist in affecting uniformity in heating of build material 22 at each subsequent spread layer.

Figure 2:
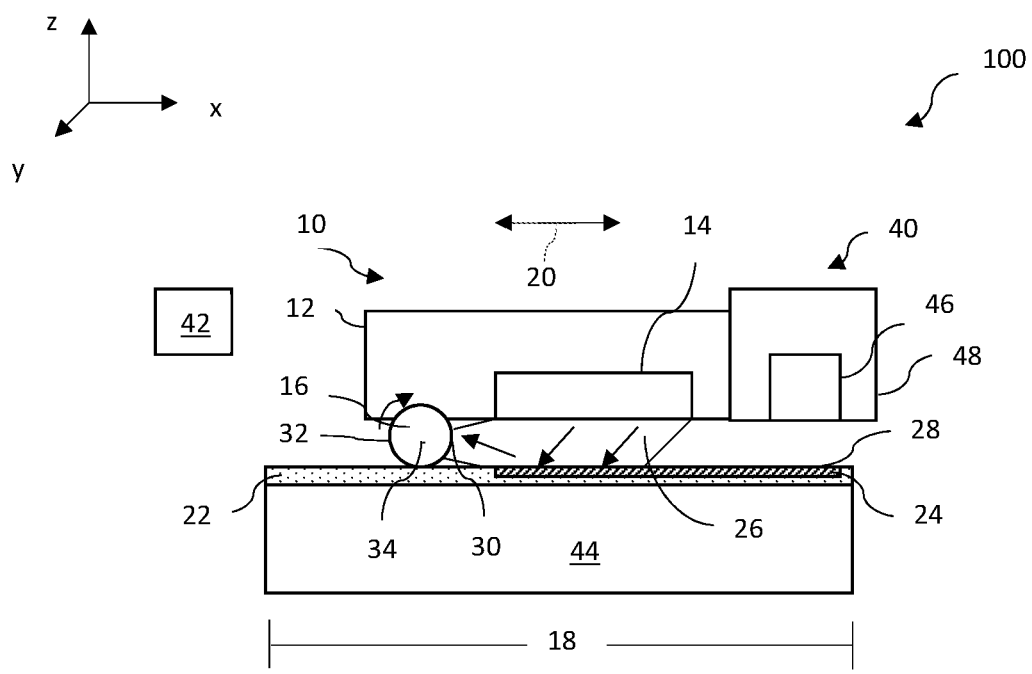
FIG. 2 is a schematic side view of an additive manufacturing machine in accordance with aspects of the present disclosure.

FIG. 2 illustrates one example of additive manufacturing machine 100 including fusing system 10. In addition to fusing system, or assembly, 10, additive manufacturing machine 100 includes a dispensing assembly 40, a controller 42, and a build chamber 44. Fusing system 10 and dispensing assembly 40 are movable along the x-axis over build chamber 44. Dispensing assembly 40 includes a printhead 46 (or other suitable liquid dispensing assemblies) mounted to a dispensing carriage 48 to selectively dispense fusing agent 24 and other liquid agents, if used. Build chamber 44 can contain build material 22 and fusing agent 24 as layers are formed. Build chamber 44 can be any suitable structure to support or contain build material 22 in build zone 18 for fusing, including underlying layers of build material 22 and in-process slice and other object structures. For a first layer of build material 22, for example, build chamber 44 can include a surface of a platform that can be moved vertically along the y-axis to accommodate the layering process. For succeeding layers of build material 22, build zone 18 can be formed on an underlying build structure within build chamber 44 including unfused and fused build material forming an object slice. Controller 42 can control roller 16 to rotate during spread of build material 22 and during fusing of build material 22 as discussed further below. Controller 42 can also control other functions and operations of additive manufacturing machine 100.

Figure 3:
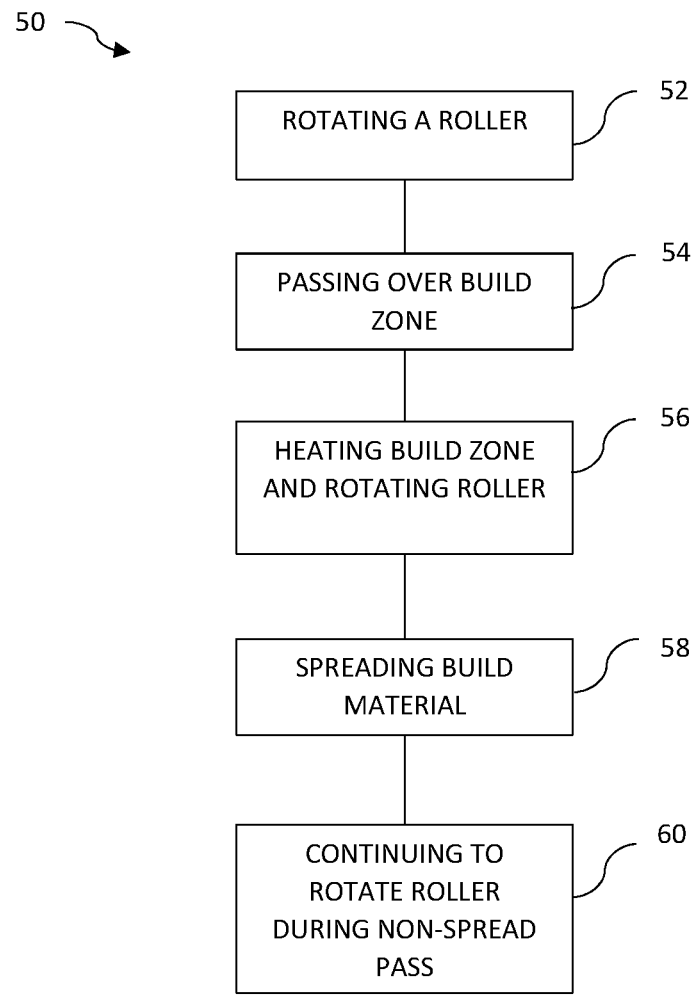
FIG. 3 is a flow chart of an example method of operating a fusing system of an additive manufacturing machine in accordance with aspects of the present disclosure.

FIG. 3 is a flow chart of an example method 50 of operating a fusing system of an additive manufacturing machine 100 in accordance with aspects of the present disclosure. At 52, a roller is rotated to receive a view factor generated from a thermic source. At 54, the carriage is passed over a build zone. At 56, the build zone and the rotating roller are heated with the thermic source as the carriage is passed over the build zone. At 58, a build material is spread to form a build material layer onto the build zone with the heated rotating roller passing over the build zone while maintaining the rotating roller within a radiative heat transfer area of the thermic source. At 60, the roller continues to rotate during a non-spreading pass.

Figure 4:
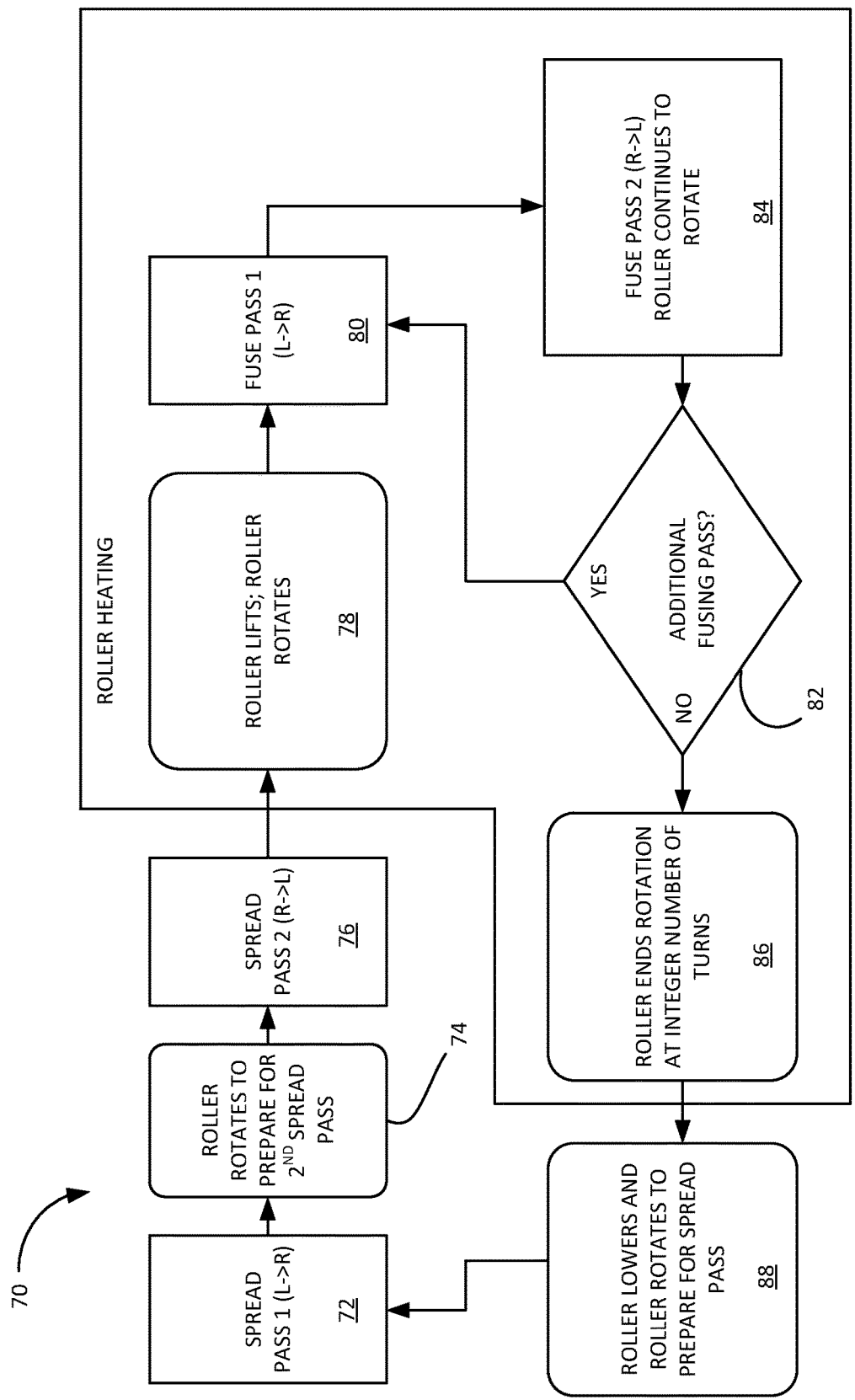
FIG. 4 is a flow chart of an example sequence of operation of a fusing system of an additive manufacturing machine in accordance with aspects of the present disclosure.

FIG. 4 is a flow chart of an example sequence of operation 70 of a fusing system of an additive manufacturing machine in accordance with aspects of the present disclosure. FIGS. 5A-8B are side and top schematic views illustrating the sequence of FIG. 4 in an example four pass fusing cycle using a fusing system of an additive manufacturing machine. Fusing system 10 and dispensing assembly 40 move bi-directionally over build zone 18 within build chamber 44 along the same line of motion so that carriages 12, 48 can follow each other across build zone 18. A dual carriage fusing system in which carriages 12, 48 move along the same line of motion can help enable faster slew speeds and overlapping functions in each pass. Carriages 12, 48 of fusing system 10 and dispensing assembly 40 move completely and entirely across build zone 18 and can be positioned on either side of build zone 18. In FIG. 4, spread and fuse passes can be described as moving from left (L) to right (R) or from right (R) to left (L) as they move along the x-axis. The direction of movement of the passes, as well as the rotational direction of roller 16, is additionally indicated by arrows in FIGS. 5A-8B. In general, roller 16 of fuser carriage 12 rotates as roller 16 is passed over build zone 18 to form layers of build material 22 over build zone 18. Dispenser carriage 48 carries fusing agent dispenser 46 to dispense fusing agent 24 on to each layer of build material 22. Thermic source 14 carries by carriage 12 to heat and irradiate layered build material 22 and fusing agent 24.

With respect to thermic source 14 of fusing system 10, thermic source 14 can include any suitable number and type of thermic sources to heat and irradiate build material. Thermic source 14 can include lower color temperature warming lamps and higher color temperature fusing lamps to provide control for heating and fusing of build material 22. Thermic source 14, illustrated in FIGS. 5A-8B, includes first and second thermal lamps 14a, 14b. First thermal lamp 14a can be of higher color temperature to sufficiently heat fusing agent 24 and build material 22 to selectively to irradiate build material 22 with fusing energy to fuse build the build material 22. Second thermal lamp 14b can be of lower color temperature to selectively heat the build material without causing fuse build. In one example, first thermal lamp 14a is a 2700 degree Kelvin or higher lamp. First thermal lamp 14a can include a series of first thermal lamps 14a each longitudinally disposed in parallel major axes disposed along the y-axis. In one example, second thermal lamp 14b is an 1800 degree Kelvin lamp. A single or multiple first and second thermal lamps 14a, 14b can be included. Second thermal lamp, or warming lamp, 14b is positioned on fuser carriage 12 adjacent roller 16. Second thermal lamp 14b is positioned between first thermal lamp 14a and roller 16.

Figure 5A:
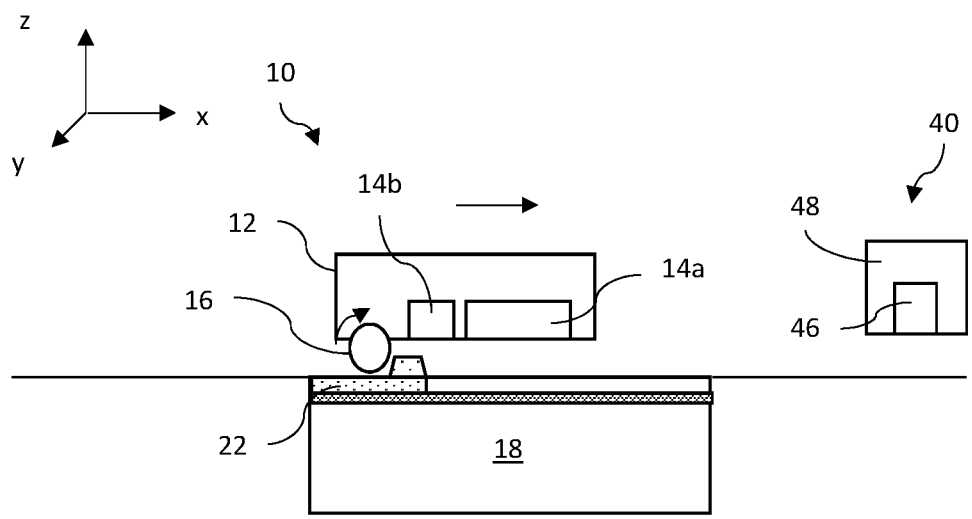
FIGS. 5A-8B are side and top schematic views illustrating a sequence of FIG. 4 in an example four pass fusing cycle using a fusing system of an additive manufacturing machine in accordance with aspects of the present disclosure.
Figure 5B:
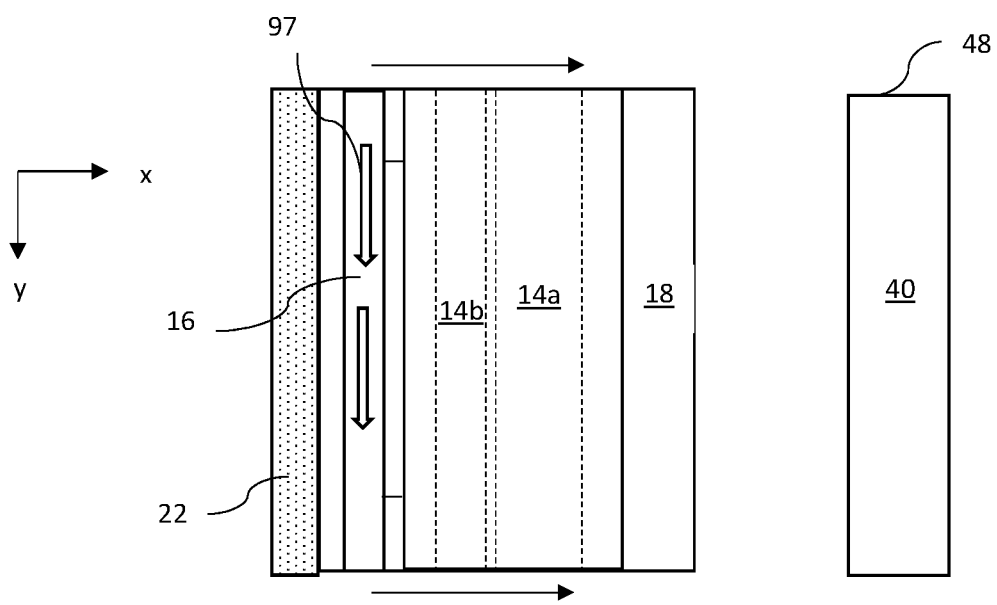

With reference to FIGS. 4 and 5A-5B, in a first pass 72 of the example sequence, fuser carriage 12 begins at left of build zone 18 and moves across build zone 18 toward right side of build zone 18. Warming lamp 14b is powered on to heat the underlying layer/slice in front of roller 16 as roller 16 is rotatably passed across build zone 18 to form a first, or next, layer of build material 22. First pass 72 is a non-fussing pass. Roller 16 is in a lowered positioned to contact build material 22 during first pass 72. As described more below, roller 16 can be moved vertically, in a z-axial direction to be selectively positioned in contact with build material 22 and fusing agent 24. In this example, roller 16 is rotated clockwise to spread build material 22 evenly across build zone 18. Thermic energy from lamp 14b is reflected from previous layers of build material 22 to uniformly heat roller 16. Heated rotating roller 16 provides heat and pressure to build material 22 as build material 22 is spread by roller 16. At 74, first pass 72 has been completed and fuser carriage 12 is to right side of build zone 18 and roller 16 counter-rotates clockwise to prepare for a second pass 76.

Figure 6A:
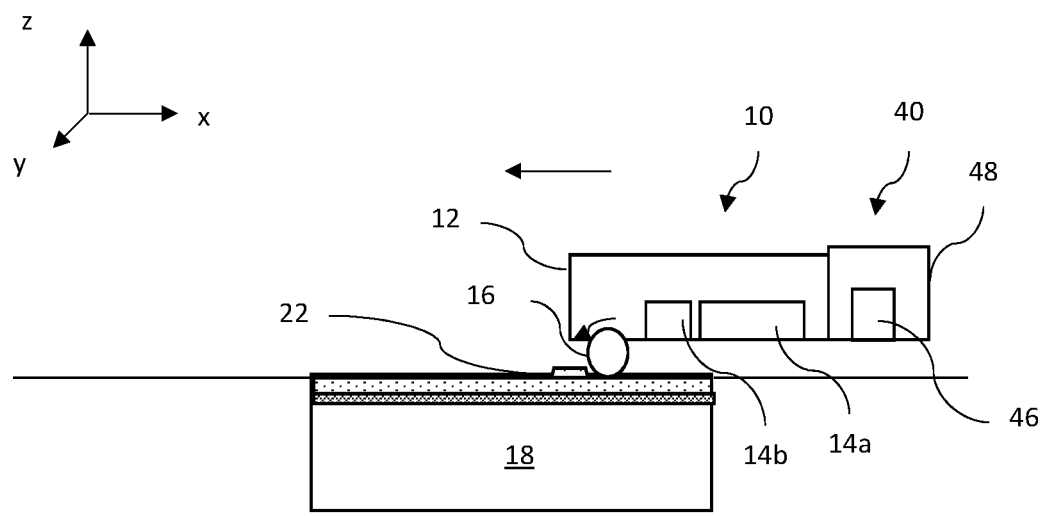
Figure 6B:
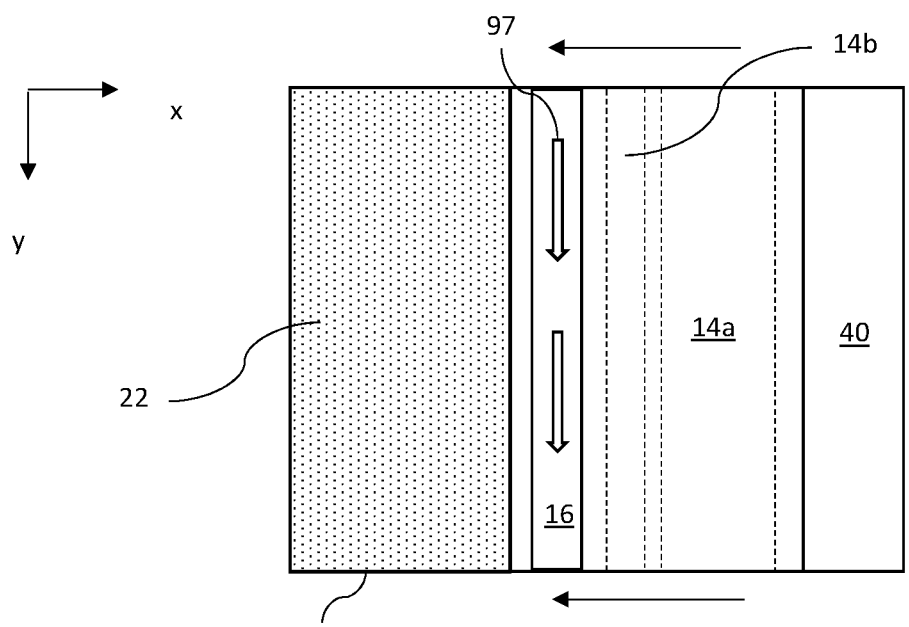

Second pass 76 is illustrated in FIGS. 6A and 6B. In second pass 76, as fuser carriage 12 moves back over build zone 18 from right to left, warming lamp 14b is on to heat the new layer of build material 22 in advance of dispenser carriage 48. Some build material 22 may not have been completely spread during first pass 72 and roller 16 can be maintained in the lowered position to complete spreading during second pass 76, in advance of warming lamp 14b and dispenser carriage 48. Dispenser 40 follows fuser system 10 over build zone 18 to dispense fusing and/or detailing agents on to the heated build material 22 in a pattern based on a next object slice.

Figure 7A:
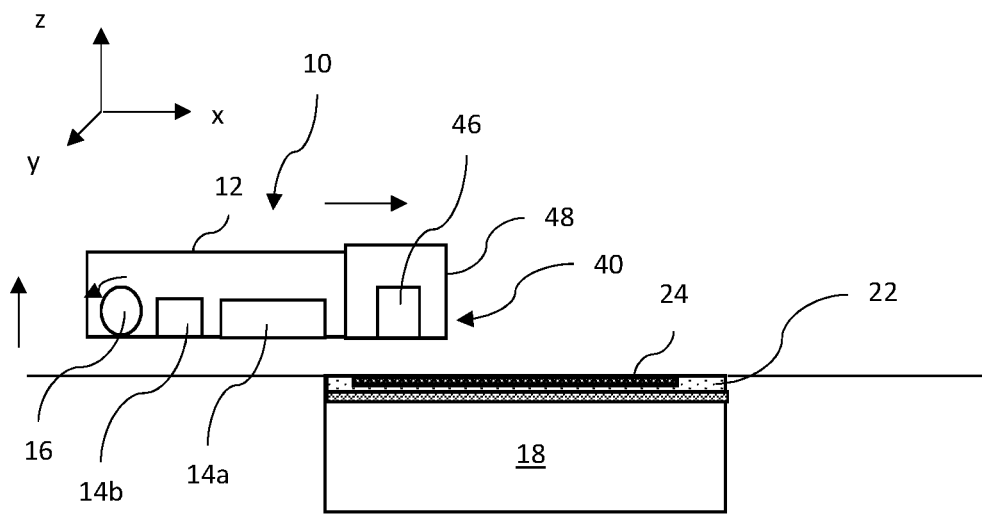
Figure 7B:
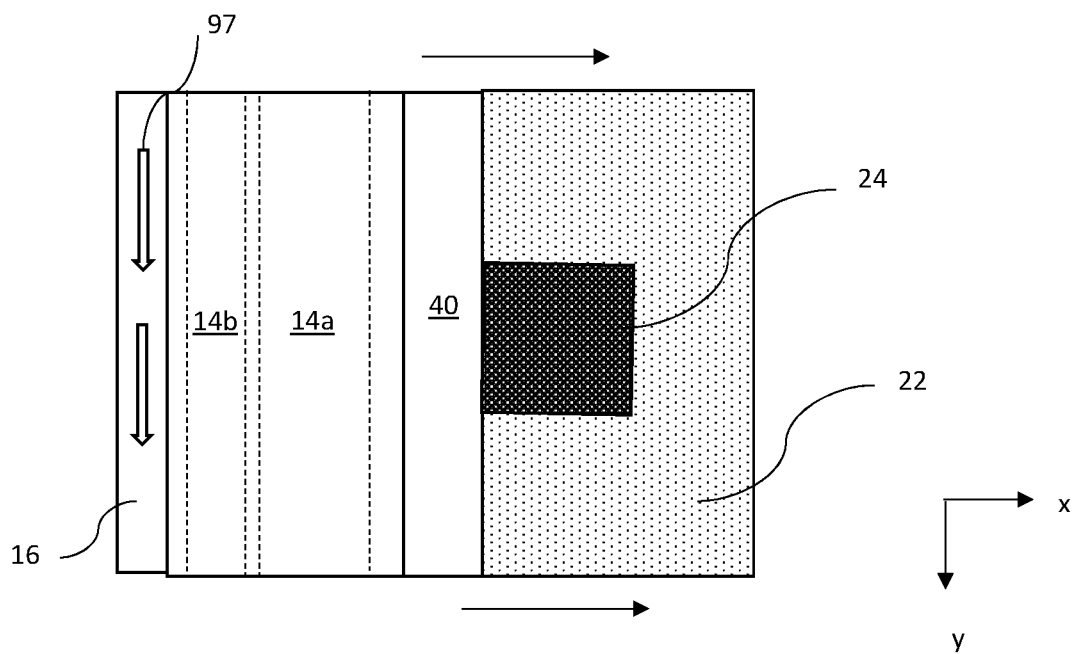
Figure 8A:
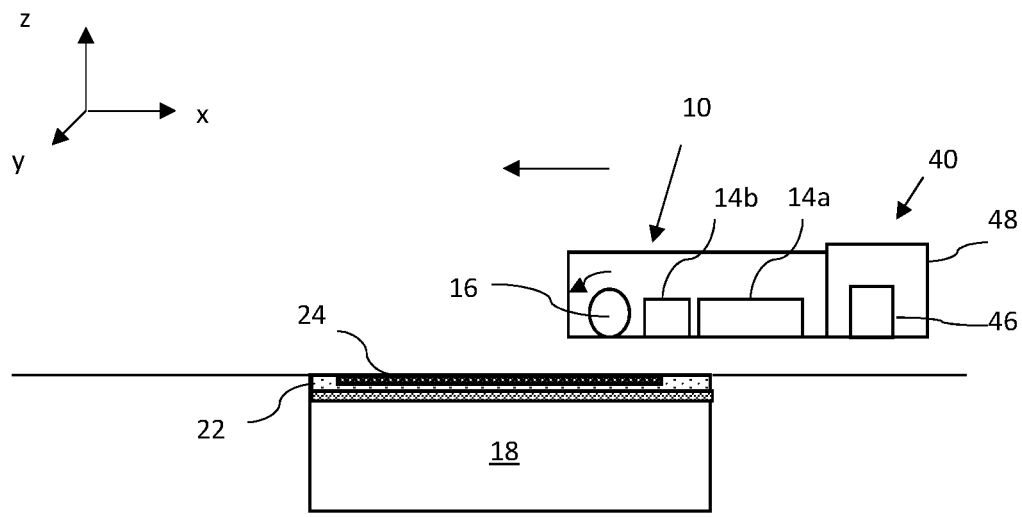
Figure 8B:
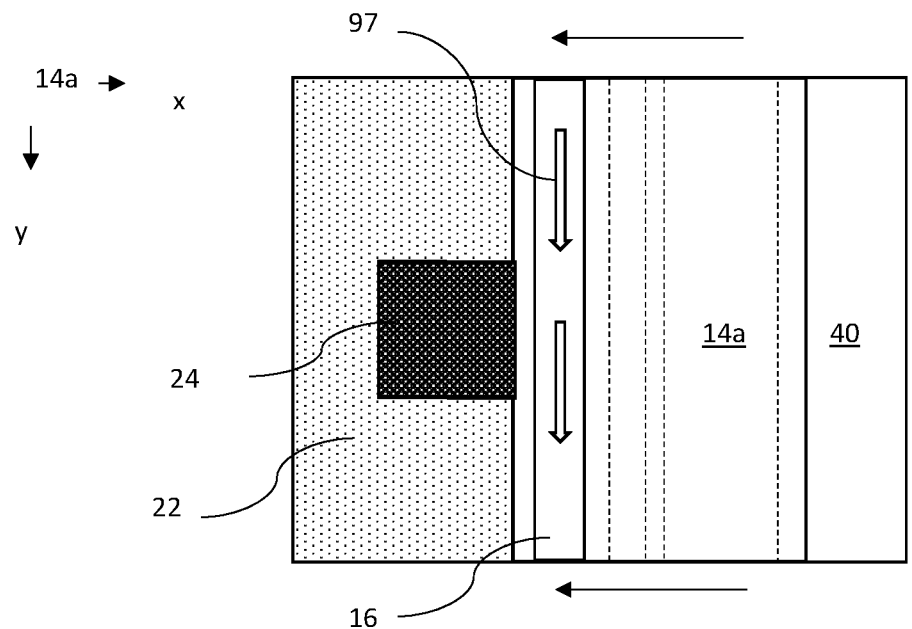

With additional reference to FIG. 4, at 78, second pass 76 is complete and roller 16 is positioned outside of build zone 18. Roller 16 can be translatably moved upward by carriage 12 in the z-axial direction from the spreading position into a second, non-spreading, retracted position. Roller 16 continues to rotate while maintained in radiant heat transfer area in preparation for a third pass 80. Third pass 80 is a fusing pass and is illustrated in FIGS. 7A and 7B. In third pass 80, dispenser assembly 40 moves back over build zone 18, from left to right, to dispense fusing and/or detailing agents 24 onto build material 22, followed by fuser system 10 with fusing lamp 14a to expose patterned build material to fusing energy.

With continued reference to FIG. 4, at 82, continuing with additional fuse passes is determined. If an additional fuse pass is to be employed, a fourth pass 84, or second fuse pass is initiated. In fourth pass 84, illustrated in FIGS. 8A and 8B, fuser carriage 12 moves back over build zone 18, from right to left, and fusing lamp 14a exposes patterned build material to fusing energy. Roller 16 continues to rotate during fourth pass 84 to maintain uniform heating of roller 16. If determined at 82 that additional fusing pass 84 is not to be employed, at 86, controller 42 can interrupt rotation of roller 16 at an integer number of turns to provide that circular runout, or any variance in radius from axis 34 along the cylindrical form of roller 16, stays in phase during subsequent spread passes 72, 76. At 88, upon completion of fuse passes 80, 84, roller 16 is vertically moved to the lowered position and roller 16 counter-rotates counter-clockwise to prepare for first spread pass 72. In some examples, roller 16 constantly rotates during and between each pass 72, 76, 80, 84, thereby having a 100% duty cycle. The four pass process may be repeated for successive layers of build material as the object is manufactured layer by layer and slice by slice.

Figure 9:
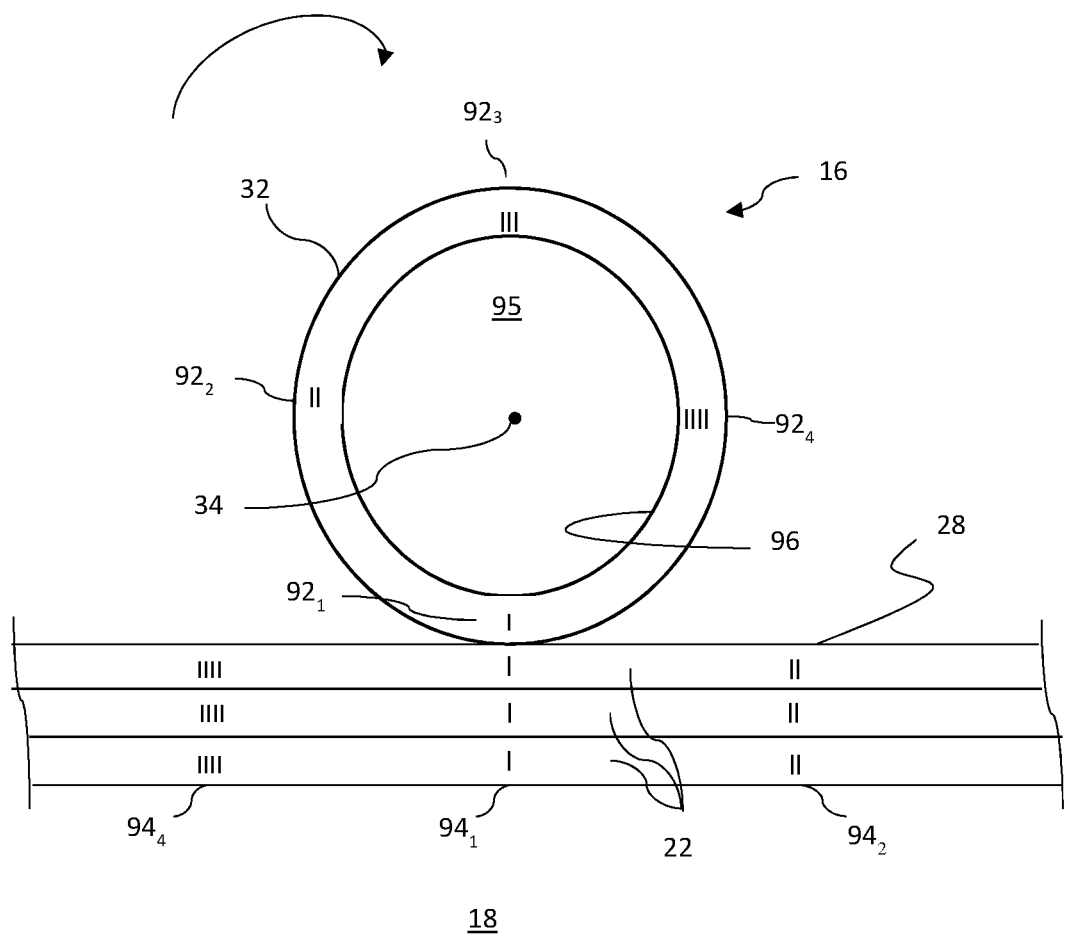
FIG. 9 illustrates an enlarged end view of a roller positioned on build material in accordance with aspects of the present disclosure.

FIG. 9 illustrates an enlarged end view of roller 16 in accordance with aspects of the present disclosure. Roller 16 can be formed of a thermally conductive material. In one example, roller 16 is formed of a metal, although other thermally conductive materials are also suitable. Roller 16 can be internally cooled. Cooling of the interior can aid in maintaining exterior surface 32 of roller 16 at a desired temperature. Roller 16 can be a tubular body with exterior circumferential surface 32 and a lumen 95 defined by an interior circumferential surface 96 and a substantially uniform wall thickness extending between the interior and exterior circumferential surfaces 32, 96. Fluid (e.g., air) can forcible flowed through roller 16, axially from first end to a second end as indicated with arrows 97 in FIGS. 5B, 6B, 7B, 8B. Roller 16 can include end caps at a first and a second end (not shown).

Roller 16 includes at least one indexed marker $92_1$-$92_x$ to indicate the rotational orientation of roller 16. Indexed markers 92 can be visible, mechanical, or electronic markers that controller 42 can use with techniques to repeatedly align and position index markers 92 in the same phased locations $94_1$-$94_x$ across build zone 18 to form substantially uniform build material thicknesses, layer upon layer. Synchronizing the rotational position of roller 16 using index markers 92 to align with phased locations 94 of build zone 18 aids in maintaining and controlling build material 22 layer thickness uniformly.

In one example, controller 42 uses indexed markers $92_1$-$92_x$ to align specific surface 32 areas of roller 16 with specific areas of build material 22 build surface 28. In one example, indexed markers $92_1$-$92_x$ includes a non-indexed encoder that provides circumferential position and controller 42 determines a circumferential position relative to an initial position from the non-indexed encoder. Controller 42 can determine an absolute roller index position (e.g., $92_1$) during initialization of first pass 72 to coordinate placement of specific areas of exterior surface 32 with specific areas of build surface 28 of build material 22 in build zone 18 (e.g., $94_1$) while spreading. In one example, controller 42 interrupts roller 16 at a specific position (e.g., $92_1$) at termination, or completion, of fusing pass 84 to re-aligned for subsequent spreading pass 72.

Rotation of roller 16 can be timed, paused, and restarted at an integer number of turns (e.g., $92_1$) as indicated with index markers 92. For example, rotation of roller 16 can be paused after fusing to end at a specific rotational, or indexed, position. Techniques can be used to rotate roller 16 a fixed amount in order that indexed markers $92_1$-$92_x$ are positioned in the original position to begin the next spreading pass in the appropriate phased locations $94_1$-$94_x$ aligned with build zone 18. At the conclusion of fusing and before spreading a subsequent layer, roller 16 stops at a predetermined specific position using index marker 92 to synchronize with phased location 94 across build zone 18 to control layer thickness uniformity. Synchronization of roller 16 across build zone 18 from pass to pass at each build layer provides that roller 16 can be phased along build zone 18, regardless of direction of travel.

Roller 16 is rotated across build zone 18 to evenly spread build material 22. Rotating roller 16 while roller 16 is lifted, or raised above build zone 18 and not in contact with build material 22 or fusing agent 24 on build zone 18 during fusing passes continues to evenly heat roller 16. The uniformly heated roller 16 provides a more uniform spread powder temperature. Roller 16 can be continuously rotated during passing over build zone 18 as well as when off build zone 18 to maintain uniform heating of roller 16. When not spreading build material 22, roller 16 does not perform a function; continuing rotation of roller 16 outside of the spreading function maintains a uniformly heated exterior surface 32 of roller 16. The passing of roller 16 over build zone 18 can be timed to synchronize the rotational orientation of roller 16 to match previous rotational orientation contact locations of build zone 18. Roller 16 can be rotated clockwise or counter-clockwise, depending on the direction of travel across build zone 18.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A fusing system for an additive manufacturing machine, the fusing system comprising:
   a carriage movable across a build zone of the additive manufacturing machine along an x-axis;
   a thermic source mounted to the carriage;
   a roller rotatably mounted to the carriage adjacent the thermic source, the roller vertically translatably mounted to the carriage to have a lowered position during a spreading pass of the carriage over the build zone for spreading of build material and a raised position during a fusing pass of the carriage over the build zone for fusing of the build material; and
   a controller configured to rotate the roller in the lowered position within a radiative heat transfer area receiving heat from the thermic source during the spreading pass, to vertically translate the roller from the lowered position to the raised position, and to rotate the roller in the raised position within the radiative heat transfer area receiving heat from the thermic source during the fusing pass.

2. The fusing system of claim 1, wherein the carriage is movable across the build zone bi-directionally along the x-axis.

3. The fusing system of claim 1, wherein the roller is tubular.

4. The fusing system of claim 1, wherein the roller is internally cooled.

5. The fusing system of claim 1, wherein the thermic source includes a first thermal lamp to selectively heat a fusing agent and a second thermal lamp to warm the build material.

6. The fusing system of claim 1, wherein the controller is further configured to align index markings of the roller with corresponding position index markings of the build zone.

7. A method of operating a fusing system of an additive manufacturing machine to form a three dimensional object, the fusing system including a carriage to which a thermic source is mounted and to which a roller is vertically translatably mounted adjacent the thermic source to have a lowered position and a raised position, the method comprising:
   during a spreading pass of the carriage over a build zone, rotating the roller in the lowered position for spreading build material while maintaining the roller within a radiative heat transfer area receiving heat from the thermic source;
   vertically translating the roller from the lowered position to the raised position; and
   during a fusing pass of the carriage over the build zone, continuing to rotate the roller in the raised position during fusing of the build material while maintaining the roller within the radiative heat transfer area receiving heat from the thermic source.

8. The method of claim 7, wherein the fusing pass comprises:
passing the carriage over the build zone; and
fusing the build material with the thermic source.

9. The method of claim 7, wherein the continuing to rotate the roller maintains a uniform temperature across an exterior circumferential surface of the roller.

10. The method of claim 7, wherein the rotating roller is heated with direct and indirect energy generated by the thermic source in the radiative heat transfer area.

11. The method of claim 7, comprising:
heating an exterior surface of the roller with reflected thermic energy emitted from the thermic source;
further spreading of the build material in a layer by passing the rotating roller over the build zone in a second direction opposite a first direction of the spreading pass; and
heating the build zone by moving the thermic source in the second direction over the build zone using the carriage.

12. The method of claim 7, comprising:
cooling the roller from within an interior of the roller.

13. An additive manufacturing machine, comprising:
a dispensing assembly including a printhead mounted to a dispensing carriage to selectively dispense a fusing agent;
a build chamber to contain a build material and the fusing agent;
a fusing system including a fuser carriage to which a thermic source is mounted and to which a rotatable roller is vertically translatably mounted adjacent the thermic source to have a lowered position and a raised position, the rotatable roller to spread and heat the build material during a spreading pass of the fuser carriage over a build zone, the thermic source to heat and fuse the build material during a fusing pass of the fuser carriage over the build zone, and the fuser carriage to maintain the rotatable roller within a radiative heat transfer area receiving heat from the thermic source during the spreading and fusing passes; and
a controller configured to rotate the rotatable roller in the lowered position within the radiative heat transfer area receiving heat from the thermic source during the spreading pass, to vertically translate the rotatable roller from the lowered position to the raised position, and to rotate the rotatable roller in the raised position within the radiative heat transfer area receiving heat from the thermic source during the fusing pass.

14. The additive manufacturing machine of claim 13, wherein the roller is vertically movable along a z-axis with respect to the thermic source.

15. The additive manufacturing machine of claim 14, wherein the roller includes index markings to coordinate with placement on the build material.

* * * * *